United States Patent [19]
Rowan

[11] 3,815,830
[45] June 11, 1974

[54] LIQUID FERTILIZER APPLICATOR

[76] Inventor: Robert A. Rowan, P.O. Box 68, Enigma, Ga. 31749

[22] Filed: Sept. 18, 1972

[21] Appl. No.: 290,119

[52] U.S. Cl. ............... 239/163, 239/169, 239/172, 239/546, 239/550, 239/578
[51] Int. Cl. .......................... B05b 1/16, B05b 1/20
[58] Field of Search .......... 239/146, 161, 163, 165, 239/169, 170, 172, 175, 176, 546, 578, 576, 577, 63, 76, 550

[56] References Cited
UNITED STATES PATENTS

| | | | |
|---|---|---|---|
| 2,123,156 | 7/1938 | Jagal | 239/172 |
| 2,149,660 | 3/1939 | Blood | 239/169 |
| 2,657,092 | 10/1953 | Joues | 239/578 |
| 2,857,863 | 10/1958 | Jessen | 239/170 |
| 3,584,788 | 6/1971 | Lloyd | 239/172 |

FOREIGN PATENTS OR APPLICATIONS

| | | | |
|---|---|---|---|
| 270,672 | 10/1966 | Australia | 239/159 |
| 846,043 | 7/1970 | Canada | 239/159 |
| 559,891 | 6/1923 | France | 239/172 |
| 203,073 | 5/1939 | Switzerland | 239/546 |
| 680,750 | 10/1952 | Great Britain | 239/550 |

*Primary Examiner*—Robert S. Ward, Jr.
*Attorney, Agent, or Firm*—Newton, Hopkins & Ormsby

[57] ABSTRACT

Uniform distribution of liquid fertilizer from an applicator carried behind a tractor or other vehicle is achieved by arranging on air bleed pipe in the liquid fertilizer supply tank. After filling, the tank is closed except for the air bleed pipe so that during operation the bottom end of the air bleed pipe maintains a substantially uniform head at the nozzle orifices of a horizontally arranged spray boom. Easily replaceable jets are used to control the orifice size and the nozzles are connected to the horizontal spray boom through short lengths of flexible tubing. A selective shut-off control is achieved by flattening the tubing lengths through an over center linkage mechanism.

7 Claims, 7 Drawing Figures

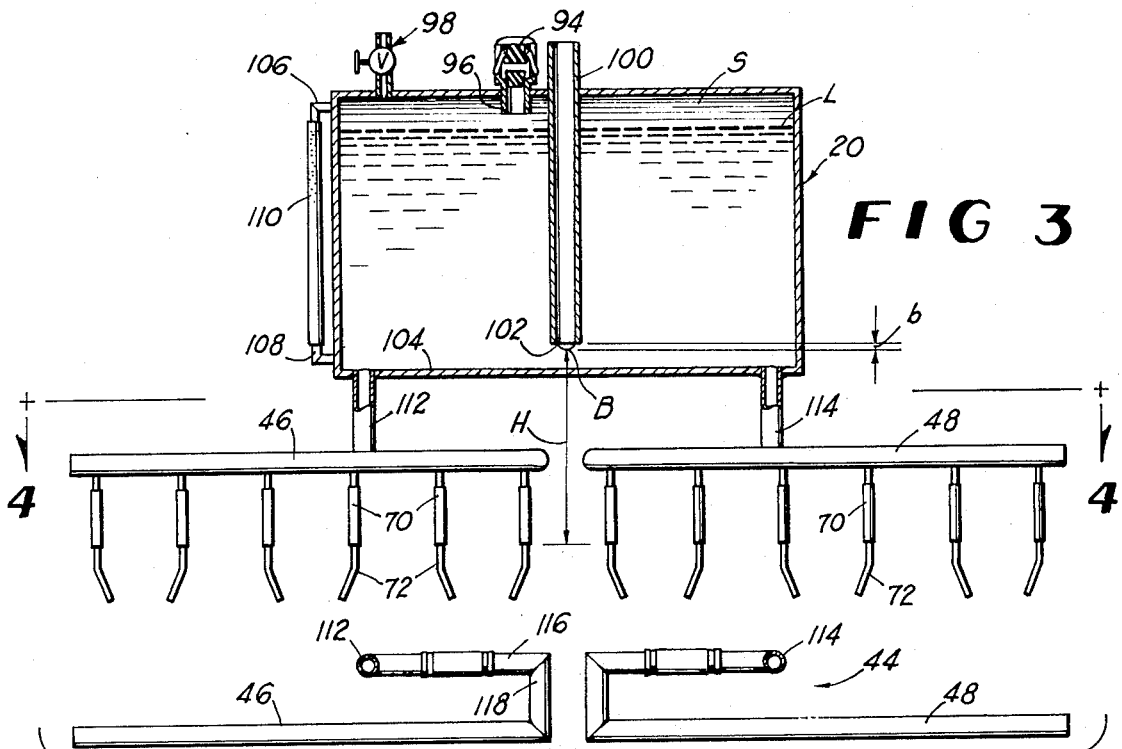
FIG 3
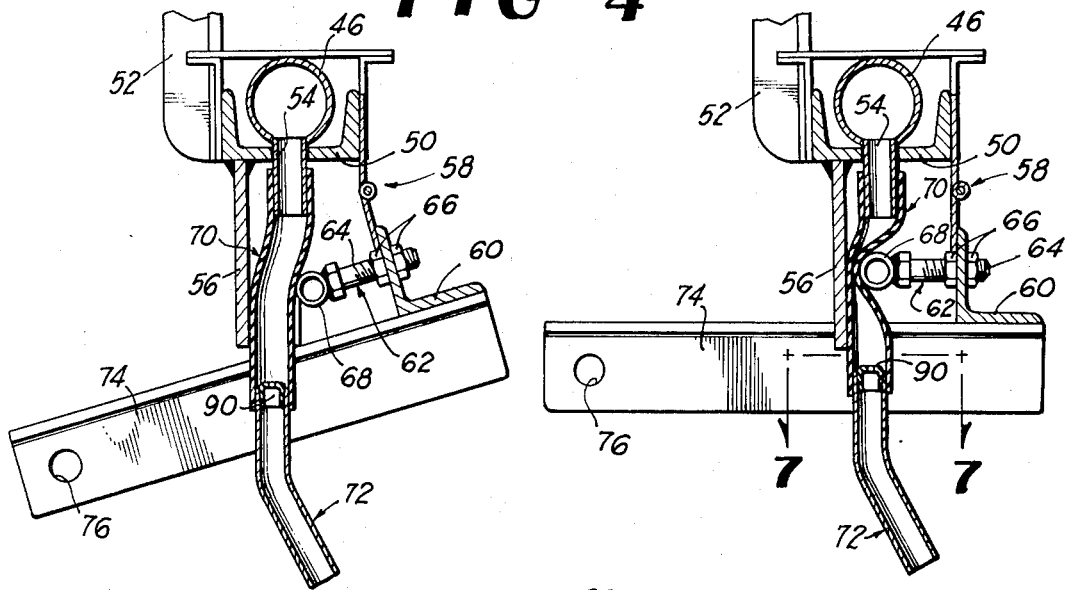
FIG 4
FIG 5  FIG 6
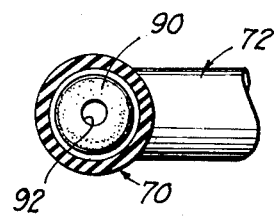
FIG 7

3,815,830

LIQUID FERTILIZER APPLICATOR

BACKGROUND OF THE INVENTION

Liquid fertilizer is extensively used in agricultural applications as a means for economically increasing the yield per acre. Dependent upon a number of factors among which are the soil conditions, type of crop, amount and distribution of moisture over the growing season, there will be a theoretical quantity of liquid fertilizer to be distributed per acre of land. This theoretical amount of fertilizer may be calculated with reasonable accuracy. This ideal represents the economically most favorable utilization of the fertilizer. Over-application of the fertilizer is economically unfavorable because it represents wasted fertilizer which will produce diminishing returns as to yield whereas under-application of the fertilizer is economically wasteful because it does not produce the economically most favorable yield.

Accordingly, it is most desirable that a liquid fertilizer applicator be so constructed and arranged that the flow distribution of liquid fertilizer therefrom will be uniform and readily controlled as to flow rate. Moreover, the applicator should be of simple, economical and rugged in construction.

Another important factor to be considered is the uniformity of fertilizer application which can be achieved over any given area of land. Obviously, it would be desirable to so control the rate of application that the fertilizer is uniformly distributed. Since applicators most feasibly are in the form of detachable, vehicle-borne assemblies it is customary to apply fertilizer by transporting the applicator over the surface of a field at a constant rate of speed while the applicator is adjusted to deliver the liquid fertilizer at a constant rate. Theoretically, this will result in a calculated uniform application of fertilizer per acre.

However, a number of practical factors militate against the attainment of uniform distribution of the fertilizer. First of all, the liquid fertilizer supply tank normally is made quite large so as to obviate the need for frequent replenishment of the fertilizer supply and, as a result, there is a substantial difference of available liquid heads as compared between the fully filled and nearly depleted condition of the supply tank. Thus, a significant fluctuation of liquid fertilizer delivery rate results from this condition alone.

Another factor to consider is the variation of the land surface from a level condition. Whereas undulations or grades which are in the plane of the direction of travel of the tractor or other vehicle do not greatly affect the rate of delivery because of the supply and distribution arrangement normally employed, grades transverse to the direction of vehicle travel may significantly affect the rate of the fertilizer delivery. Briefly stated, this latter effect results from the fact that the normally horizontal and transversely extending spray boom assembly of the applicator may be of significant transverse length so that on a transverse grade, one end of the boom will be substantially lower than the opposite end so that the application of fertilizer is heaviest at the lower end of the boom and diminishes or decreases from this lower end to the opposite or higher end. Other factors also enter the picture, for example the fact that it is virtually impossible to achieve absolutely constant rate of vehicular travel. However, with a fixed throttle setting and a selected gear engaged, conventional farm tractors will operate through their engine governor systems to produce substantial uniformity of vehicular speed.

BRIEF SUMMARY OF THE INVENTION

The present invention is directed to an arrangement in a liquid fertilizer applicator wherein the application of the fertilizer is assured of a substantially more uniform rate of application than heretofore has been achieved. Significantly, this uniformity of application rate is achieved in a simple, economical and extremely practical manner.

Essentially, the achievement of improved uniformity and dispensing rate is achieved by obtaining a fixed head of liquid fertilizer acting upon the delivery nozzle irrespective of the height of the fertilizer in the supply tank. Moreover, certain physical relations between the boom and the supply tank are utilized to reduce variations in distribution rates incidental to displacement of the boom from the normally horizontal position.

Further in conformity with the objective of providing a simple, rugged and extremely practical unit, the present invention embodies a nozzle shut-off mechanism allowing the operator rapidly and easily to terminate the liquid fertilizer flow when desired.

BRIEF DESCRIPTION OF THE DRAWING FIGURES

FIG. 3 is a vertical transverse section taken through the preferred embodiment;

FIG. 4 is a plan view section taken substantially along the plane of section line 4—4 in FIG. 3 and illustrating the construction and layout of the boom assembly;

FIG. 5 is an enlarged vertical section taken through the boom and one of the applicator nozzles illustrating the nozzle and associated structure;

FIG. 6 is a view similar to FIG. 5 but showing the shut-off position of the component parts; and, FIG. 7 is an enlarged horizontal section taken substantially along the plane of section line 7—7 in FIG. 6 illustrating certain details of the nozzle assembly.

DETAILED DESCRIPTION OF THE INVENTION

Figure 1:
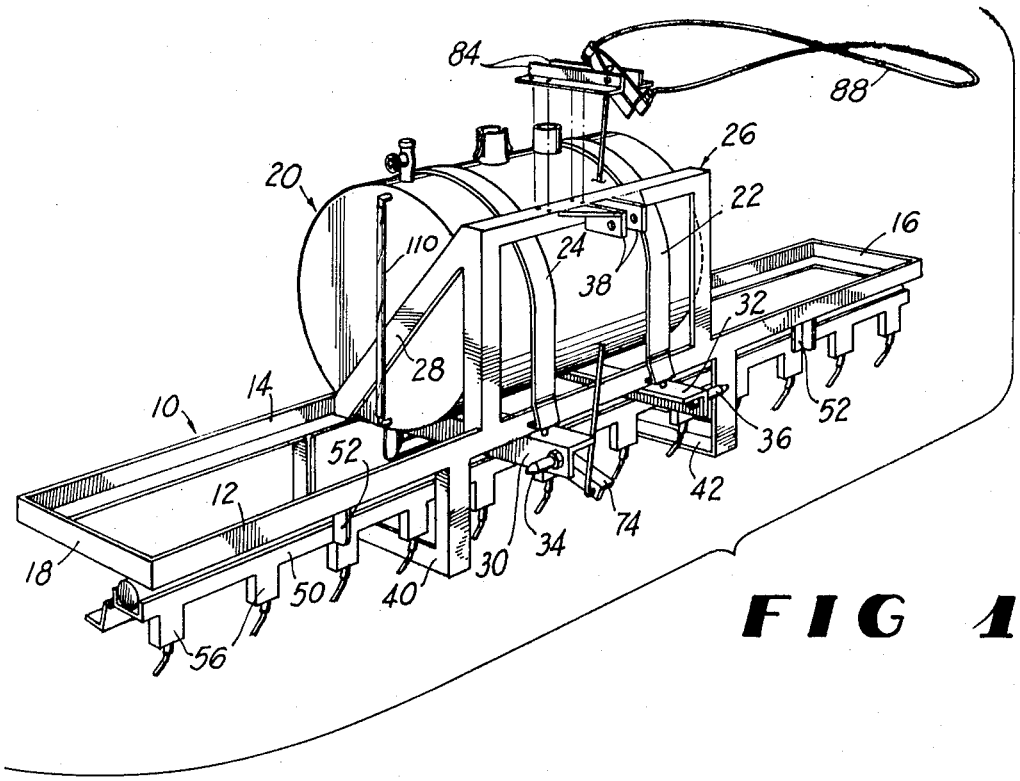
FIG. 1 is a perspective view of a liquid fertilizer applicator according to the present invention illustrating a preferred embodiment thereof.

The illustrative embodiment shown in FIG. 1 comprises a main frame assembly indicated generally by the reference character 10 which may include the front and rear frame members 12 and 14 connected at opposite ends by the longitudinal or fore-and-aft frame members 16 and 18. A supply tank indicated generally by the reference character 20 is mounted on the frame by suitable strap assemblies 22 and 24, ahead of which is provided the forward, vertical frame extension of generally rectangular form as indicated by the reference character 26. This upright structure is provided with inclined side brace members such as that indicated by the reference character 28 in FIG. 1.

The frame includes further a pair of longitudinally extending and forwardly projecting central elements 30 and 32 which carry a pair of laterally outwardly projecting attachment pins 34 and 36 and the upper cross member of the upright frame portion 26 is provided with a pair of spaced ears 38 apertured to receive a transversely extending attachment pin so as to cooperate with the pins 34 and 36 to provide the conventional three point attachment arrangement adapted to be coupled to the conventional three point lift arm arrangement of agricultural tractors. In this manner, the entire assemblage shown in FIG. 1 is supported behind a conventional agricultural tractor in cantilevered trailing relation thereto as will be well understood by those skilled in the art.

To complete the frame structure, there are provided a pair of underslung skid or support devices 40, 42 which act as pedestals upon which the entire frame assembly and associated mechanism rests when the device is out of use.

Mounted to and underslung from the frame assembly is a boom assembly as indicated generally by the reference 44 in FIG. 4. Conveniently, as best shown in FIGS. 5 and 6, the main lengths 46, 48 of the boom assembly are received and fixed within transversely extending channel member 50 suitably attached to depending frame members 52 fixed to the forward member 12, see particularly FIG. 1, the channel member being apertured at spaced points along its length to receive the nipple extensions 54 communicating with the interiors of the main tubes 46 and 48 respectively. At the location of each of these nipples 54, the channel member 50 is provided with depending reaction members 56 or plates, the purpose of which will be presently apparent. These reaction plates are located on the forward sides of the nipples 54, as will be readily apparent from FIG. 1.

A hinge mechanism indicated generally by the reference character 58 secured to the rear sides of the channel 50 pivotally carries a transversely extending and horizontal actuator bar 60 as shown in FIGS. 5 and 6, the bar 60 having, for each of the nipples 54, a presser foot arrangement 62 adjustably attached thereto. Each presser foot includes a threaded shank 64 projecting through the actuator bar 60 and adjustably secured thereto by means of the nuts 66 and the forward end of the threaded stem portion 64 is provided with a transverse cylindrical presser foot 68 which is adapted, when the actuator bar 60 is positioned as shown in FIG. 6, to clamp shut and close off a length of flexible tubing 70 fitted over and depending from each nipple 54. The material of the tubing is flexible or resilient and preferably is of gum rubber or the like so that it may be easily slipped onto and removed from its associated nipple 54. The lower end of each tubing member receives a nozzle member indicated generally by the reference character 72 which preferably is simply a length of metal tubing crooked as shown and fitted at its upper end into the lower end of the flexible tubing 70. This leaves a free unencumbered length of the flexible tubing between the nipple 54 and the nozzle 72 which is the region upon which the presser foot assembly 62 acts in each case.

Figure 2:
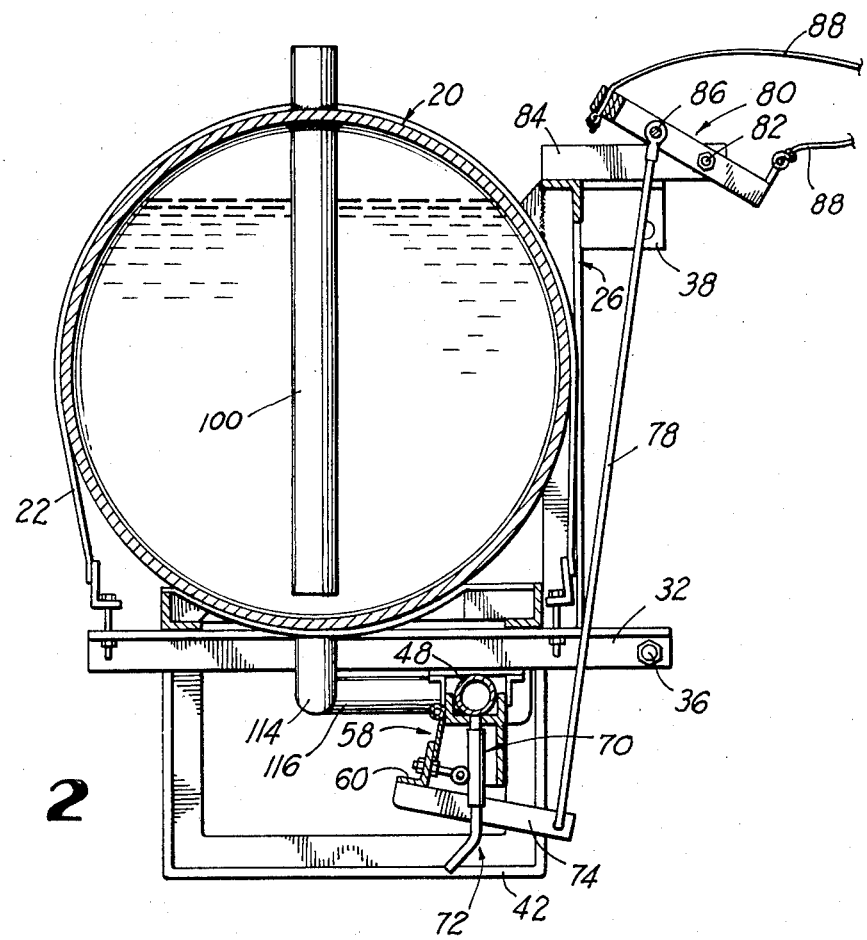
FIG. 2 is a vertical longitudinal section taken through the assembly as shown in FIG. 1 and illustrating details on enlarged scale.

The actuating bar 60 is provided with a forwardly extending arm 74 which is also evident in FIG. 1 and the forward extremity of this arm is provided with an aperture 76 by means of which the link rod 78 is coupled thereto, see particularly FIG. 2.

A wishbone member indicated generally by the reference character 80 is pivotally attached by means of hinge pin 82 to the frame assembly between the forwardly extending attaching bars 84 thereof and the upper end of the rod 78 is pivotally attached at 86 to this wishbone assembly. Through a length of rope or the like 88 attached to the wishbone assembly 80 the operator of the tractor may remotely pivot the wishbone so that in one position, the pivot pin 86 is over center with respect to the pivot point 82 in FIG. 2. This results in the position of the actuator bar 60 as shown in FIG. 6 and each presser foot 62 is so adjusted relative to the actuator bar 60 when this over center condition prevails such that each associated tubing length 70 is flattened or clamped shut to prevent the flow of liquid fertilizer from the associated nozzle.

Individual presser feet 62 are balanced throughout as to their adjusted lengths so that the pressures exerted individually thereby are substantially uniform.

As noted above, each individual nozzle tube 72 is of elbow form so that a measure of directional flow control is obtained at each nozzle as for example as indicated in FIG. 3 wherein individual pairs of adjacent nozzles are directed toward each other to be directed to the base of a crop row, the overall spacings of the nipples 54 being such as to comply with the conventional crop row spacings.

Slip-fitted into the upper end of each metallic nozzle elbow 72 is a flow control jet 90 having a sized orifice 92 therein, see particularly FIG. 7, jets with various sizes of orifices being readily accommodated to provide in conjunction with the ground speed of the towing vehicle the desired coverage per acre.

The manner in which a substantially constant head is provided at each jet 90 will be evident from a consideration of FIG. 3. As shown, the tank 20 is provided with a filler cap 94 cooperating with the filler neck 96 such that when the cap is in place, the neck 96 is closed so as to be air tight. Also associated with the tank is a vent valve indicated by the reference character 98, the purpose of which will be presently apparent. Additionally, the tank is provided with a vertically elongate vent tube 100 whose lower end 102 is located deep inside the tank 20 adjacent the bottom level 104 thereof. Through the medium of a pair of elbow tube fittings 106 and 108 having a length of transparent flexible tubing 110 extending between them, a sight glass arrangement is provided so as to enable the level L of the liquid fertilizer quickly to be ascertained.

The bottom of the tank 20 is provided with two vertically extending outlet couplings 112 and 114 leading to the individual booms which constitute the boom assembly 44 and it will be noticed, from FIG. 4, that each of these boom sections is of J-shaped configuration in plan view, each including a transversely extending horizontal section 116 leading from its associated tank outlet and connecting to the main section 46 or 48 through a short fore-and-aft section 118. This particular configuration of each spray boom minimizes fluctuations in flow which might otherwise be caused by surging of the liquid within the boom due to lateral tilting or shaking of the applicator assembly. It will also be noted that the booms are symmetrically arranged on either side of the vent tube 100, the purpose of which will be presently apparent.

When the tank 20 is to be filled, the vent 98 is opened and the tank is filled through the filler neck 96 until it is full or nearly full, whereafter the filler cap 94 is engaged to close off the filler neck 96 and the vent 98 is also closed. During this time, of course, the shut-off for the applicator nozzles is in the closed position as shown in FIG. 6. At this time, whatever clearance space S is present within the tank 20 above the liquid level L will be at atmospheric pressure and the vent tube 100 will be filled with liquid fertilizer to that same level. Shortly after initiation of the fertilizer application, the level of the liquid in the vent tube 100 will fall to the lower end 102 thereof while at the same time the level of the fertilizer within the tank proper will not have dropped very much; and, when this condition is reached, the fertilizer will provide a substantially uniform liquid head at the several jets 90 of the various nozzle assemblies. To appreciate this, it will be noted from FIG. 3 that an air bubble B will commence to be formed as soon as the fertilizer level has dropped within the vent tube 100 to the lower end 102 thereof so that it is the height H between the lower extremity of this bubble B and the level of the jets 90 as shown in FIG. 3 which establishes the liquid head. After the bubble B has grown in size it will eventually break away and this bubble of air will be added to that in the clearance space S causing a sudden fluctuation in the head H by the amount $b$ which is equal to the bubble size before it broke away. Practice has shown that this variable head component $b$ is always less than about 1 centimeter so that the variable head distance b will vary from zero up to somewhat less than a centimeter as bubbles successively form and gurgle into the tank. Thus, if the initial spacing between the lower end 102 of the vent 100 and the height of the jets 90 is sufficiently large with respect to the maximum distance $b$, no appreciable effect on the fertilizer distribution will be produced due to the formations of the bubbles. In practice, the lower end of 102 of the vent tube 100 should be about 30 centimeters above the level of the jets 90.

Fluctuation of liquid fertilizer flow through the various nozzles due to tilting of the applicator in the transverse plane is minimized by having the boom assembly symmetrical on either side of the center line established by the vent tube 100 and by minimizing the spacing between this center line laterally to the outermost nozzles on either side thereof. To this end, two tanks may be provided, each located so that the vent tube thereof is symmetrical with an associated spray boom.

It will also be appreciated that it is possible to dispense with the filler neck and associated filler cap and utilize the vent tube 100 itself for the filling operation.

What is claimed is:

1. A liquid applicator comprising, in combination:
   a frame including means for attachment to a vehicle such as an agricultural tractor so that the applicator may be travelled over the surface of a field at a selected velocity to allow the application of a selected quantity of liquid per unit of field area;
   a hollow boom carried by said frame and including a plurality of nipples leading therefrom;
   a tank on said frame and connected to said boom for delivery of liquid thereto;
   a length of flexible tubing connected to and extending from each nipple;
   a nozzle fitted to the free end of each such length of tubing for directing liquid onto the ground and leaving a free and unencumbered portion of the tubing between it and the associated nipple; and
   means for selectively flattening the free and unencumbered portions of the tubing lengths to block flow of liquid from said nozzles, said means comprising a bar pivotally connected to said frame, a flattening foot adjustably secured to said bar opposite each tubing length for selective adjustment in length such that in one position of said bar all tubing lengths are flattened closed substantially to the same degree, a backup member behind each tubing length opposite the associated flattening foot, and means for selectively holding said bar in one position thereof.

2. A liquid applicator as defined in claim 1 including a sized orifice member removably received in each nozzle to control the rate of liquid flow discharge therefrom.

3. A liquid applicator as defined in claim 1 including vent means in said tank for maintaining a substantially constant head of liquid at said nozzles.

4. A liquid applicator as defined in claim 3 wherein said boom includes a pair of members each of J-shaped plan view configuration and arranged symmetrically on either side of said frame below and with respect to said vent means and each communicating with said tank.

5. A liquid applicator as defined in claim 3 wherein said nozzles are provided with replaceable jets and said jets are spaced below the bottom of said vent by an amount substantially greater than one centimeter.

6. A liquid applicator as defined in claim 5 wherein said nozzles are located in a transverse plane symmetrically on either side of the lower end of said vent.

7. A liquid applicator comprising, in combination:
   a frame including means for attachment to a vehicle such as an agricultural tractor so that the applicator may be travelled over the surface of a field at a selected velocity to allow the application of a selected quantity of liquid per unit of field area;
   a boom mounted on said frame;
   supply means mounted on said frame for delivering a substantially constant head of liquid to said boom and including a tank adapted to contain a supply of liquid with a closed clearance space above the liquid and a vent tube projecting downwardly into said tank and terminating adjacent the bottom thereof controllably to gurgle air bubbles up through the liquid to said clearance space; and,
   a set of transversely spaced nozzles mounted on said boom in a transverse plane symmetrically to each side of the lower end of said vent tube for directing liquid from said boom onto the ground surface with minimal fluctuations in liquid flow through the nozzles occasioned by tilting of the applicator in the transverse plane.

* * * * *